June 18, 1940.   A. OBERHOFFKEN   2,204,907
OPERATING HANDLE
Filed Sept. 18, 1939   2 Sheets-Sheet 1
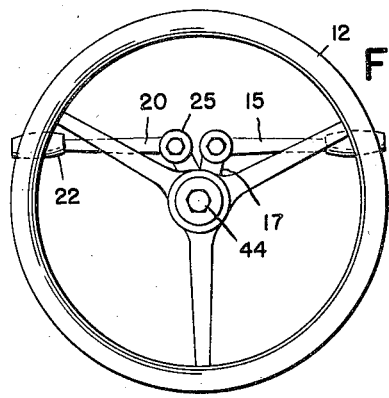
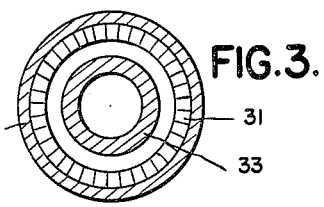
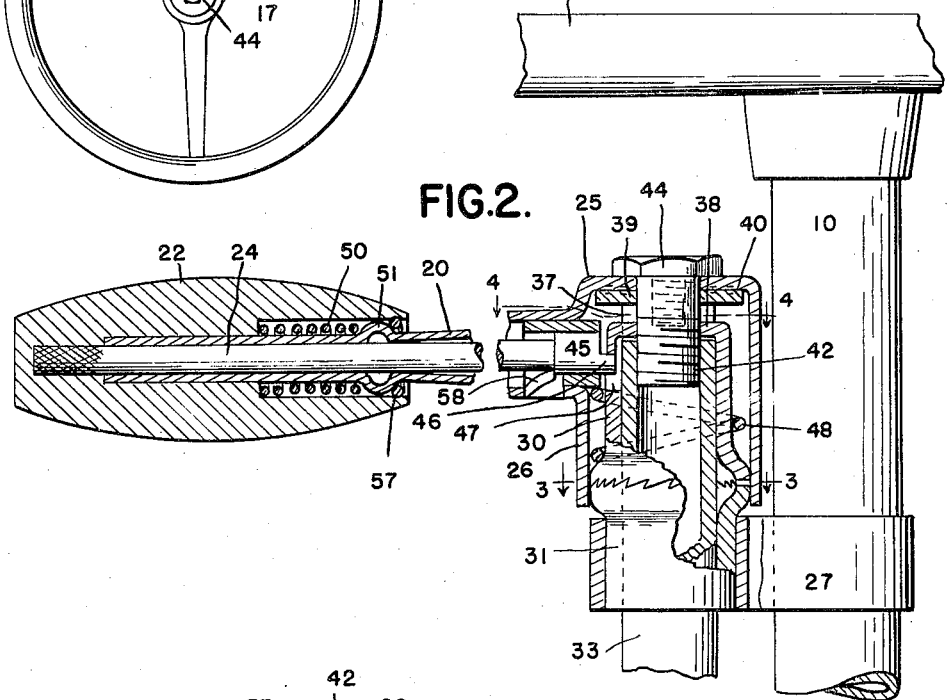
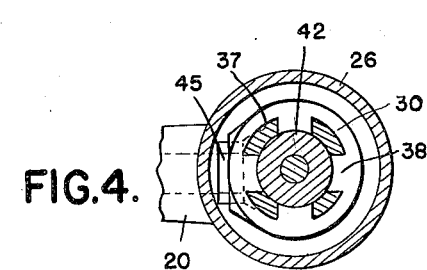
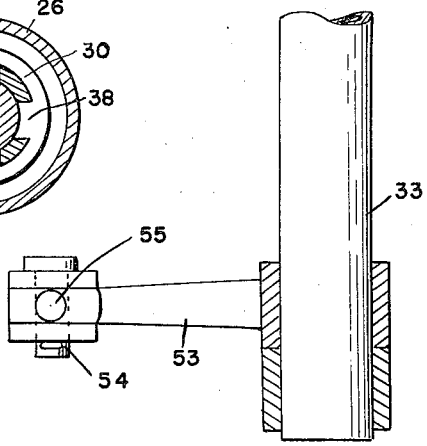
INVENTOR.
ALEXANDER OBERHOFFKEN
BY
ATTORNEYS June 18, 1940.    A. OBERHOFFKEN    2,204,907
OPERATING HANDLE
Filed Sept. 18, 1939    2 Sheets-Sheet 2
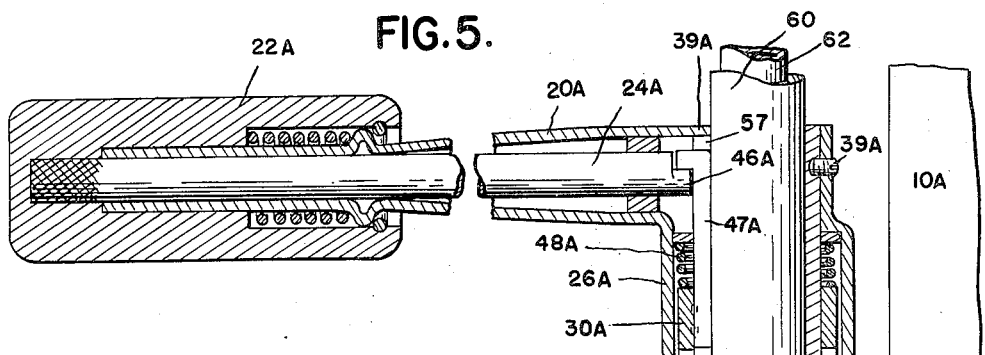
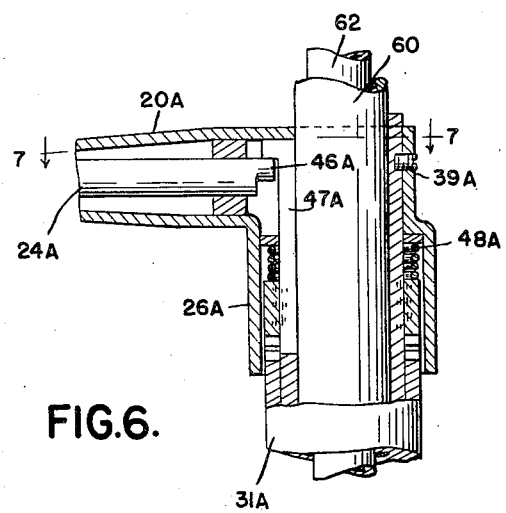
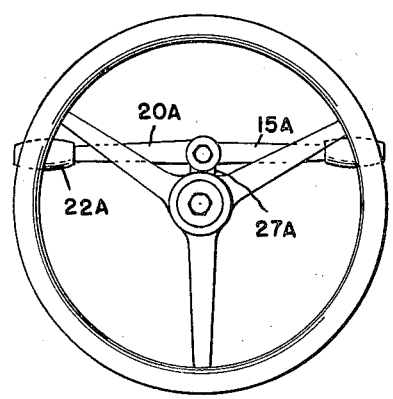
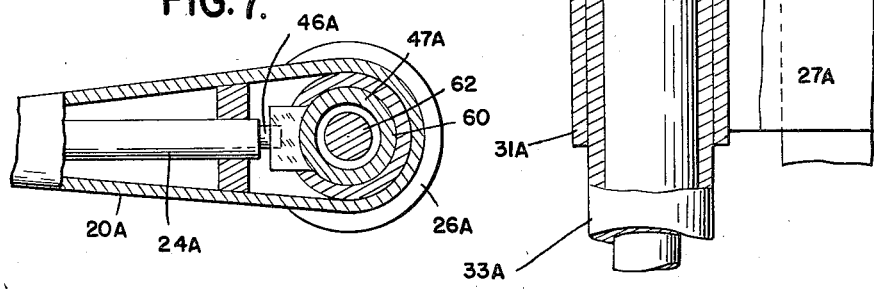
INVENTOR.
ALEXANDER OBERHOFFKEN
BY
ATTORNEYS Patented June 18, 1940

2,204,907

UNITED STATES PATENT OFFICE 2,204,907

OPERATING HANDLE

Alexander Oberhoffken, Southfield Township, Oakland County, Mich., assignor to American Forging and Socket Company, Pontiac, Mich., a corporation of Michigan Application September 18, 1939, Serial No. 295,468

5 Claims. (Cl. 74—536)

This invention relates to lever-type operating handles, for controlling remotely located mechanisms. While particularly described in connection with a lever arranged to operate the brakes of a motor vehicle it will be recognized that the invention is equally applicable to operating handles of other varieties.

An important object of the invention is to provide improved and simplified lever means of compact construction and neat appearance, incorporating pawl and ratchet mechanism for holding the lever in any set position, adapted to be mounted at the top of a supporting post in such manner that the operating handle is swingable about the axis of the post, the entire assembly being adapted to be carried by or arranged adjacent the steering column of a motor car.

Another object is to provide such a pawl and ratchet type operating lever, most of the parts of which are constructed of sheet metal, which is very strong despite the relatively small size of its parts, and which is very easily releasable no matter how hard the brakes or other controlled mechanism may be set. A further object is to provide such operating mechanism which may be constructed to harmonize in appearance with the gear shift lever of a motor car, so that the brake lever and gear shift lever may project in opposite directions beneath the steering wheel, both being supported by the steering column.

Still another object is to provide improved and very compact pawl and ratchet means so designed that the stresses applied thereto are widely distributed, and to provide in conjunction therewith improved releasing means for operating the same.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a plan view of a steering wheel and column assembly of the variety commonly used in motor vehicles, showing the same equipped with an operating lever constructed in accordance with the present invention.

Figure 2 is a side elevational view of such a steering wheel and column, partly broken away, and with my improved lever mechanism shown in substantially central vertical section.

Figures 3 and 4 are transverse sections taken substantially on the lines 3—3 and 4—4, respectively, of Figure 2, and looking in the direction of the arrows.

Figure 5 is a view similar to Figure 2 showing a somewhat modified construction.

Figure 6 is a view similar to Figure 5 showing the pawl and ratchet means released;

Figure 7 is a sectional detail taken substantially on the line 7—7 of Figure 6, and looking in the direction of the arrows.

Figure 8 is a plan view of a steering wheel and column assembly provided with the modified lever construction.

Referring now to the drawings:

Reference character 10 designates the steering post of a motor vehicle (not shown), the steering wheel being designated 12. Reference character 15 indicates the gear shift lever, by which the speed ranges of the transmission may be controlled in operating the vehicle, such lever being mounted on a bracket 17, and projecting to the right therefrom in a position directly below the wheel, and which will be recognized as more or less conventional. My improved brake lever, denominated 20, is adapted to be symmetrically disposed to project in the opposite direction, also directly beneath the wheel, as best shown in Figures 1 and 2. The body of the lever is of tubular sheet metal construction, and the hand grip 22 is rotatable thereupon and secured to a rod 24 which projects through the tubular lever into the axially disposed casing 25 which forms the hub of and turns as a unit with the lever. A skirt portion 26 of the casing extends downwardly to enclose the crown-shaped pawl and ratchet elements 30—31, the latter fast in a bracket 27 clamped or otherwise secured to the steering column 10. The ratchet element provides a sleeve bearing for the tubular shaft 33, which serves to convey to the brakes or other controlled mechanism motion imparted to the lever by the operator.

The pawl member 30 also encircles the shaft 33, and will be seen to comprise a cupped sheet metal member having cooperating crown ratchet teeth engageable with the teeth of ratchet member 31. The pawl member is keyed to turn with the lever, but movable up and down in the casing 25 to and from engagement with the ratchet member. Slidable connection between the pawl and shaft 33 is provided by slots 37 formed in the upper end of the tubular shaft, into which slots inturned tongues 38 carried by the upper end of the pawl member slidably project. Cooperating inwardly projecting tongue portions 39 carried by a keying washer 40 serve to key the lever to the shaft, the washer being welded to the interior of the casing at the top, as shown in Figure 2. A tapped stud 42 is threaded or otherwise secured in the upper end of the hollow shaft 33 and interiorly threaded at its top, to receive cap nut 44, which overhangs the top of the casing and serves to locate the lever assembly.

The enlarged inner end 45 of the shaft 24 carries an eccentric pin 46 projecting into a vertically elongated slot 47 in the wall of the pawl element 30. A spring 48 tends to maintain the pawl in engagement with the ratchet.

The shape of the ratchet teeth is preferably such that the handle may be pulled down without lifting the pawl, the lost motion provided by the slot 47 being sufficient to permit the pawl to ride over the ratchet member. The teeth of course prevent return movement of the handle, but when it is desired to release the handle for return movement, it is only necessary to turn the hand grip portion 22 far enough to raise the pawl, whereupon the handle may be returned. An arm 53 secured to the lower end of the shaft 33 may be connected to the brakes or other mechanism to be operated, as by means of a clevis 54 and rod 55.

Additional spring means 56 trapped in the hand grip and reacting outwardly thereagainst and inwardly against the abutment 51 on lever 20, serves to prevent rattles and take up lost motion. A snap ring 57 fast in the grip 22 and bearing against the other face of the abutment prevents escape of the hand grip and acts as a bearing. Escape of the shaft 24 and parts attached thereto is further prevented by a tongue 52 struck inwardly from the body of the lever and lying behind the eccentric body 45.

In the somewhat modified construction shown in Figures 5, 6, 7 and 8 the supporting bracket 27A by which the apparatus is mounted on the steering column 10A carries a sleeve bearing 31A toothed at its top and also constituting the crown-shaped ratchet element. The cooperating downwardly facing crowned-pawl element 30A is slidable on the hollow shaft 33A, within the skirted casing portion 26A formed integrally with the lever 20A. An operating arm 47A secured to the interior of the annular pawl 30A projects upwardly and is slidable in a slot 57 in the tubular shaft 33A, its upper extremity being outturned to overengage the eccentric portion 46A, carried by the inner end of shaft 24A which, as in the embodiment first described, is attached to and rotatable by the hand grip portion 22A. The handle is secured to shaft 33A as by set screw 39A. A spring 48A normally maintains the pawl in engagement with the ratchet.

The upper extremity of the handle is also open to permit the extension of the tube 59 therethrough, through which tube in turn extends another shaft 62, which may serve to control the gear changing mechanism of the transmission. As shown in Figure 8, the operating lever 15A for such gear changing mechanism, which may be connected to the shaft 62 by any suitable means (unshown), may be mounted to project in the opposite direction from the tubular member 60, which serves as a support.

I am aware that the invention may be embodied in other specific forms without departing from the spirit or essential attributes thereof, and I therefore desire the present embodiments to be considered in all respects as illustrative and not restrictive; reference being had to the appended claims rather than to the foregoing description to indicate the scope of the invention.

I claim:

1. Operating mechanism comprising in combination with a support, a rockable shaft carried thereby, and pawl and ratchet means for holding said shaft against unwanted rocking movement, comprising a fixed ratchet encircling the shaft and having ratchet teeth extending longitudinally thereof, a pawl comprising a sleeve slidable along the shaft and having a plurality of complementary teeth engageable with and disengageable from the teeth of said ratchet, means yieldably urging said pawl into engagement with the ratchet, and means for moving said pawl out of engagement with said ratchet, comprising a hollow handle extending outwardly from a position adjacent said pawl, operating means for the pawl comprising a handgrip portion rotatably carried by the handle, a shaft extending through said handle and connected to the handgrip portion, and an eccentric actuating portion operatively connected to the shaft and to the pawl for operating the latter in response to rotation of the handgrip portion.

2. Means as set forth in claim 1 in which said ratchet comprises a sleeve forming a bearing for the shaft, means keying the pawl element to the shaft, means for rocking the shaft, for rotary movement therewith but independent sliding movement, a casing surrounding the pawl and attached to said shaft and handle, and spring means within the casing and surrounding the pawl and urging the latter into engagement with the ratchet.

3. Means as set forth in claim 1 including a casing attached to said handle and surrounding said pawl, and means connecting the pawl to the casing for rotary movement therewith but allowing independent longitudinal movement of the pawl to and from engagement with the ratchet.

4. Means as set forth in claim 1 including a casing attached to said handle and surrounding said pawl, means connecting the pawl to the casing for rotary movement therewith but allowing independent longitudinal movement of the pawl to and from engagement with the ratchet, and means for securing the casing and thereby the entire assembly including the handle and pawl to the shaft.

5. Operating means for remotely located mechanism comprising in combination with a shaft, a tubular ratchet member encircling the shaft and having longitudinally extending teeth at one end thereof, a tubular pawl encircling and slidable along the shaft and having complementary teeth at one end movable to and from engagement with the teeth of the ratchet, said shaft being provided with keying portions engaging the pawl to insure unitary rotation of the pawl and shaft but extending to an end of the shaft to permit removal of said pawl, a casing encircling the pawl and also removably attached to said keying portions but held against longitudinal movement with relation to the shaft, a lever attached to said casing and projecting laterally therefrom, operating means for said pawl carried by said handle including a member underengaging a portion of said pawl and preventing unwanted separation thereof from the casing, whereby the casing together with the lever and pawl may be removed as a unit from the end of the shaft.

ALEXANDER OBERHOFFKEN.